(Model.)
T. H. CAMPBELL.
APPARATUS FOR REMOVING TIN AND GALVANIZED COATING.
No. 255,252.  Patented Mar. 21, 1882.
5 Sheets—Sheet 1.
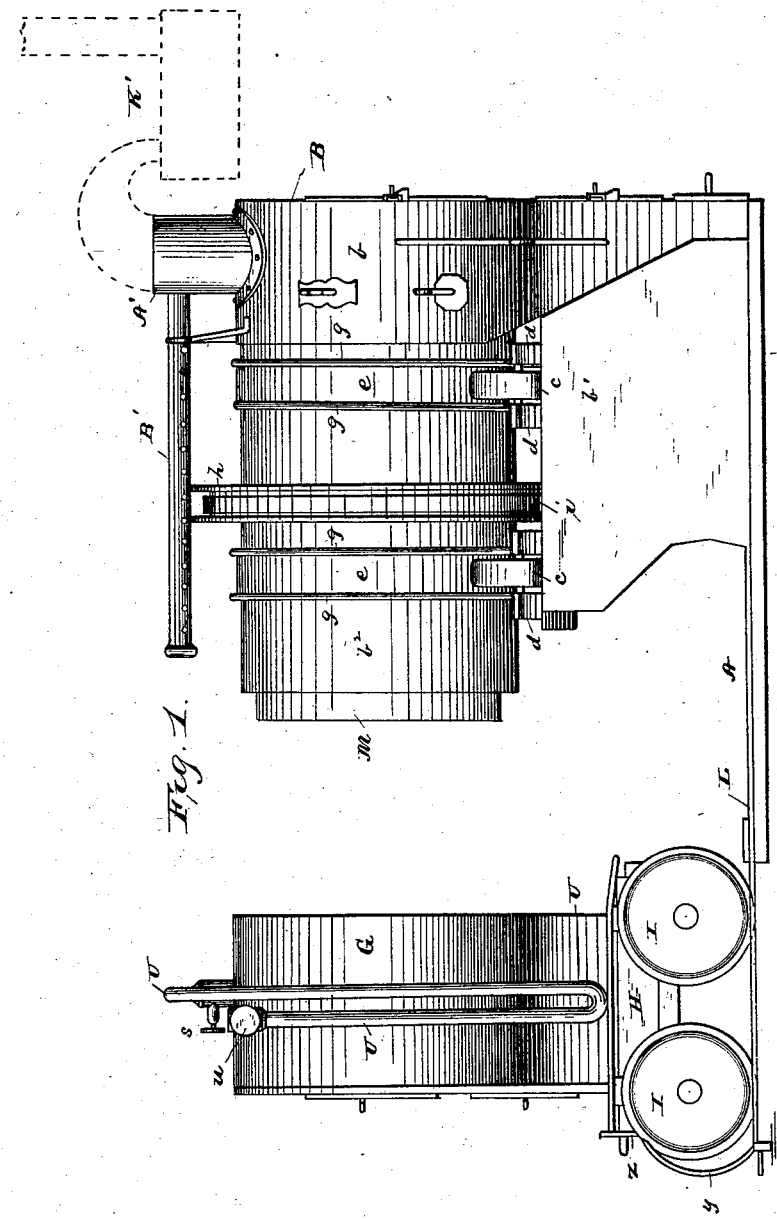

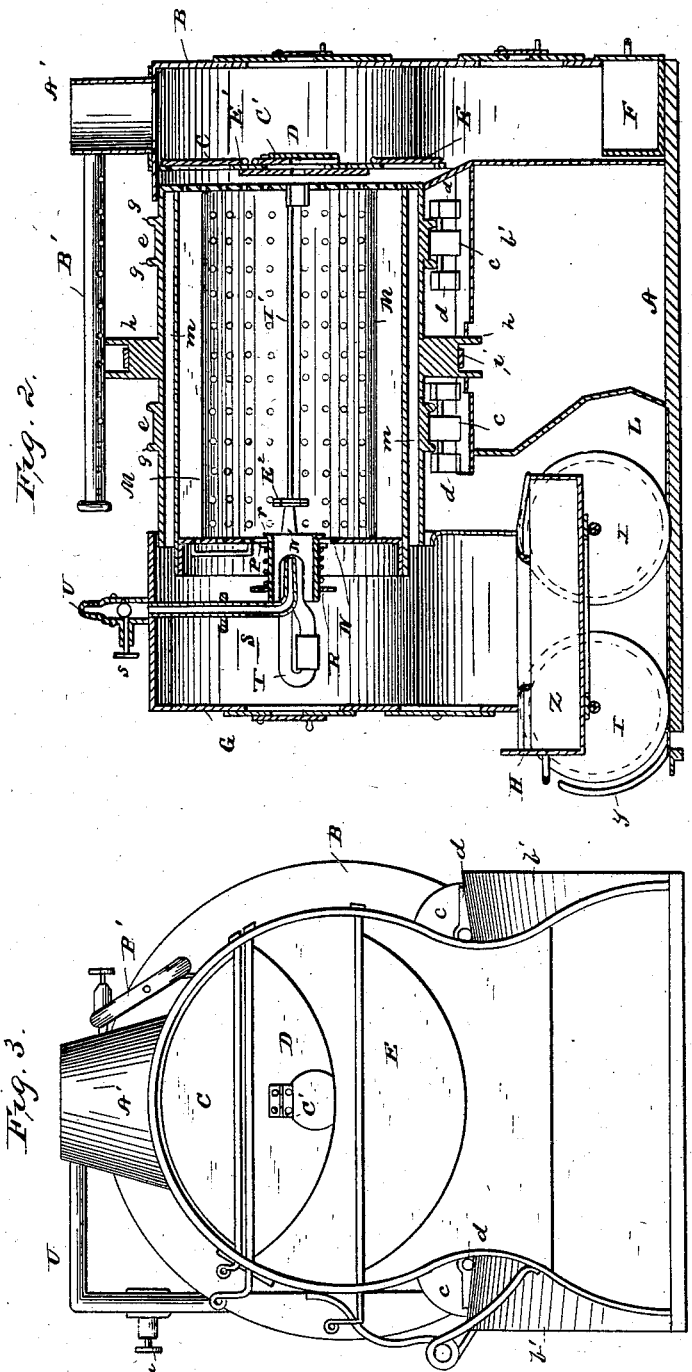

(Model.) 5 Sheets—Sheet 3.
T. H. CAMPBELL.
APPARATUS FOR REMOVING TIN AND GALVANIZED COATING.
No. 255,252. Patented Mar. 21, 1882.
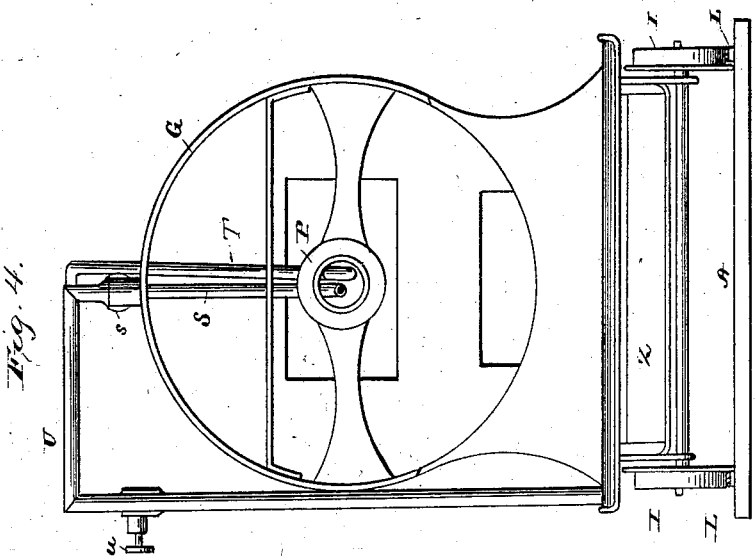
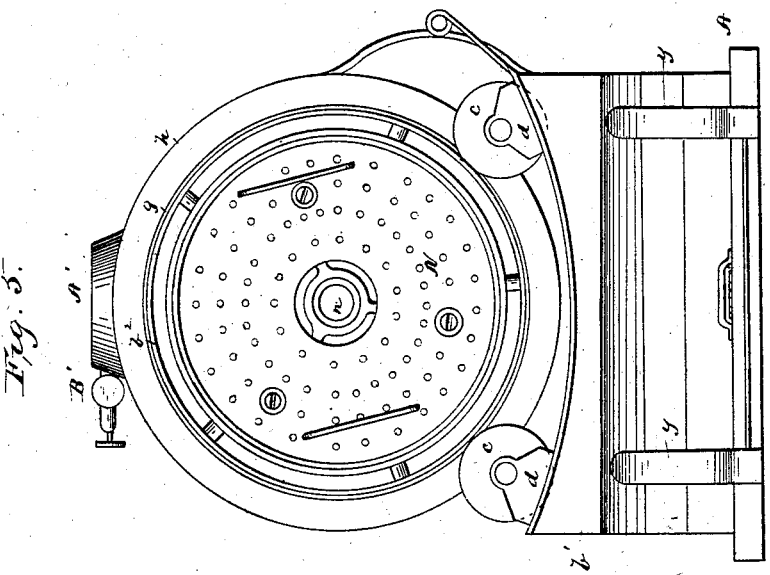

(Model.) 5 Sheets—Sheet 4.
T. H. CAMPBELL.
APPARATUS FOR REMOVING TIN AND GALVANIZED COATING.
No. 255,252. Patented Mar. 21, 1882.
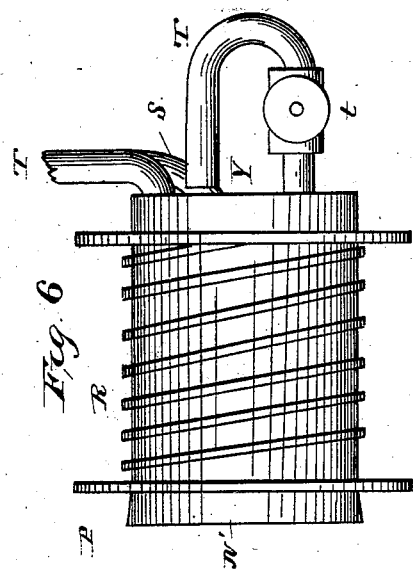
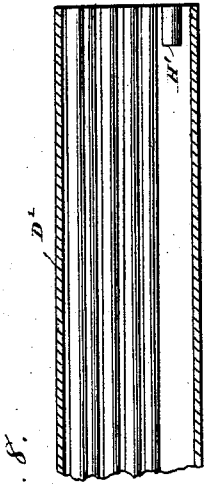
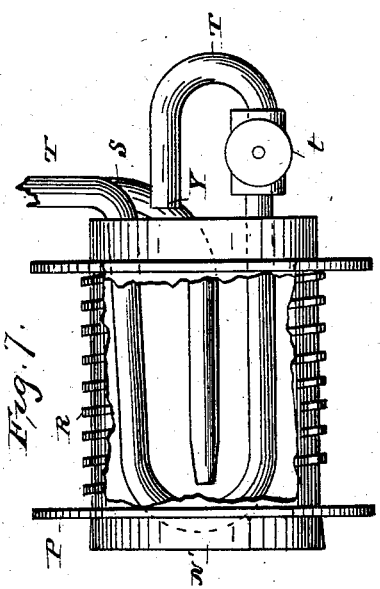
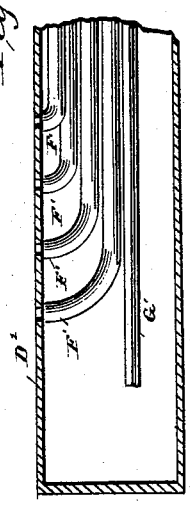
Witnesses.
Edwin L. Jewell.
H. Aubrey Toulmin
Inventor,
Thomas H. Campbell.
By C. M. Alexander
his Atty.

(Model.) 5 Sheets—Sheet 5.
T. H. CAMPBELL.
APPARATUS FOR REMOVING TIN AND GALVANIZED COATING.
No. 255,252. Patented Mar. 21, 1882.

Witnesses.
Edwin L. Jewell
H. Aubrey Toulmin

Inventor.
Thomas H. Campbell
By C. M. Alexander
Attorney,

UNITED STATES PATENT OFFICE.

THOMAS H. CAMPBELL, OF ALLEGHENY, PENNSYLVANIA.

APPARATUS FOR REMOVING TIN AND GALVANIZED COATING.

SPECIFICATION forming part of Letters Patent No. 255,252, dated March 21, 1882.

Application filed December 2, 1881. (Model.)

*To all whom it may concern:*

Be it known that I, THOMAS H. CAMPBELL, of Allegheny, in the county of Allegheny, and in the State of Pennsylvania, have invented certain new and useful Improvements in Apparatus for Removing Tin and Galvanized Coatings; and I do hereby declare that the following is a full, clear, and exact description thereof, reference being had to the accompanying drawings, and to the letters of reference marked thereon, making a part of this specification.

This invention relates to certain improvements in apparatus for recovering the tin and zinc from tinned or galvanized sheet-iron scraps; and it has for its objects to provide a machine in which the scraps can be conveniently heated to the proper temperature and suitably agitated while being heated and the melted metal automatically collected or recovered in a metallic state or in the form of an oxide, as more fully hereinafter specified. These objects I attain by the apparatus and mechanism illustrated in the accompanying drawings, in which—

Figure 9:
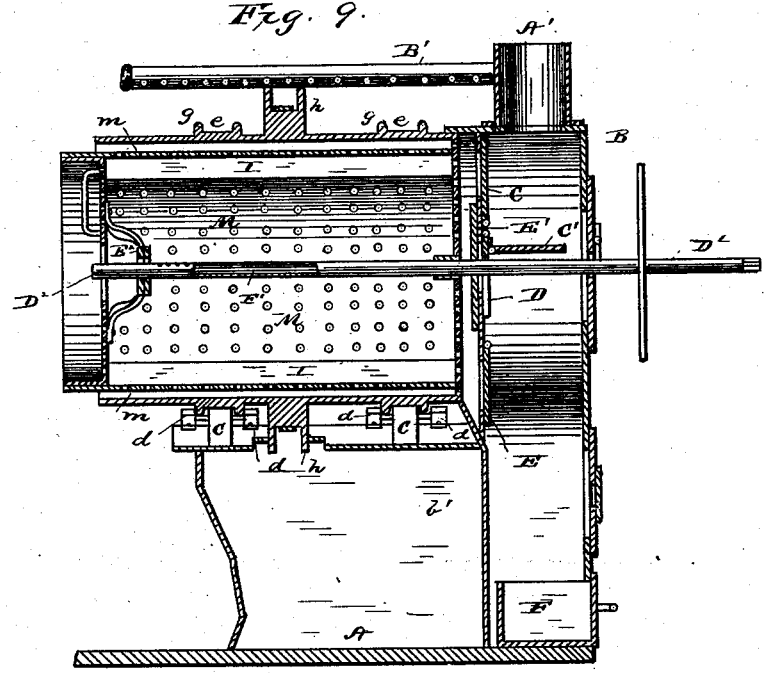
Figure 10:
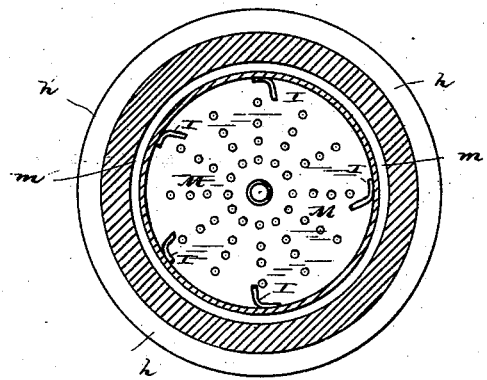

Figure 1 represents a side elevation of my improved apparatus, showing the rear section drawn back from the front section of the same. Fig. 2 represents a longitudinal vertical central sectional view of the apparatus. Fig. 3 represents a front elevation of the apparatus with the front wall thereof removed. Fig. 4 represents a front view of the rear section of the apparatus detached. Fig. 5 represents a rear view of the front section of the apparatus. Fig. 6 represents a detached side elevation of the heating device; and Fig. 7, a similar view of said heating device with a portion removed, showing the relative position of the jet-tubes thereof; Fig. 8, a longitudinal sectional view of an auxiliary heating device which I sometimes use. Fig. 9 is a vertical longitudinal sectional view of the front section of my apparatus; and Fig. 10, a cross-sectional view of the drum or cylinder, showing the agitating ledges.

The letter A indicates the bed or base of the apparatus, to which the front section, B, is securely attached in any convenient manner. The said front section consists of a vertical smoke-box, $b$, a raised platform, $b'$, at the rear of the smoke-box, and a revolving drum, $b^2$, mounted on friction-rollers $c$, which are journaled in suitable bearings, $d$, secured to the platform. The drum is provided with suitable treads, $e$, on its periphery, which travel on the friction-rollers, and with flanges $g$, which prevent said drum from shifting longitudinally. The periphery of the drum is also provided with a flanged annulus, $h$, over which passes a belt, $i$, by means of which the drum may be suitably rotated. The forward end of the drum extends into a circular opening at the rear of the smoke-box, the said end of the drum being provided with a perforated head, by means of which it communicates with the smoke-box.

The letters C D E indicate a series of dampers secured to the damper-rods, extending through the walls of the smoke-box, by means of which communication between the drum and smoke-box can be entirely cut off or regulated at will. The lower part of the smoke-box is provided with a receptacle or drawer, F, in which the oxidized metal passing off may be deposited and collected.

The letter G indicates the rear section of the apparatus, which rests upon a base, H, mounted on flanged wheels I, which are adapted to travel back and forth upon an extensible longitudinal track, L, secured to the base A of the apparatus. The said rear section consists of a metallic shell having a circular opening in front for the reception of the rear end of the front section. The rotary drum is provided on its interior with a concentric perforated cylinder, M, of such size as to leave an annular space, $m$, as indicated. The inner cylinder, at its rear end, is provided with a removable perforated head, N, which has a central opening, $n$, through which the heating device projects. The said heating device consists of a short tube, N', secured centrally within the rear section of the apparatus in such position that it will enter the central opening in the head N, when the rear section is placed against the rear of the drum forming part of the forward section. The said tube N' has mounted upon it a sliding annulus, P, behind which is located a spiral spring, P², which annulus is held on the tube by means of a rim, $r$, at the end of said tube. The annulus serves to make a close joint with the head N when the front and rear sections of the apparatus are brought together. Into the tube N' project from the rear the bent ends of the two pipes S T extending from a common pipe, U, the end of the pipe S terminating in a nozzle, and the pipe T being provided with a return-bend having a forwardly-extending nozzle, Y, which terminates at the rear of the nozzle on the pipe S. The pipe U extends to one side of the apparatus, and is bent vertically downward and then upward, the upper extremity being connected with a suitable oil-reservoir. The respective pipes S, T, and U are provided with suitable controlling-valves, $s\ t\ u$, as indicated.

The rear section of the apparatus is provided with a receptacle or drawer, Z. The movable sections of the rails upon which the rear section of the apparatus is adapted to travel are provided with stops $y$ at their rear ends to prevent the rear section from running off the track.

The letter A' indicates the smoke-stack, and B', a perforated tube extending longitudinally over the top of the drum, and connected by means of suitable connections with a water-supply tank, whereby the drum may be kept from becoming overheated. The front and rear portions of the apparatus are provided with suitable doors having peep-holes, by means of which the interior may be observed.

The damper D is provided with an opening at its lower edge and with a hinged flap, C', by means of which the opening can be covered or uncovered. The said opening is for the insertion of a perforated pipe, $D^2$, which extends backward through an opening in a support, E', secured to the rear of the smoke-box, and rests at its rear end in a support, $E^2$, attached to the rear end of the inner perforated cylinder. The said pipe, $D^2$, contains a series of longitudinal pipes, F', which connect with the respective perforations in said pipe $D^2$, their outer ends connecting with a suitable gas-supply, whereby jets of gas may be injected and burned in inner perforated cylinder of the drum. The said pipe $D^2$ is provided with a longitudinal pipe, G', and a short pipe, H', by means of which a current of water may be circulated through said pipe $D^2$ to keep the parts cool, the water entering through the pipe G, and as it becomes heated escaping through the pipe H'. The interior of the inner cylinder is provided with a series of longitudinal ledges, I', by means of which the scraps are continuously carried up and dropped, and thereby agitated while being heated.

From the smoke-stack may be extended a condenser, K', as indicated in dotted lines, through which the fumes of the volatilized metal may be compelled to pass in order to thoroughly effect the condensation of the oxide passing off.

The operation of my invention is as follows: The scrap metal is placed in the drum, the rear section having been drawn back and the rear drum-head removed for the purpose. The drum-head is replaced and the rear section moved up to the forward section. Oil is allowed to flow to the burning devices through the respective pipes, the return-bend in one of said pipes serving as a heater, whereby the oil may be converted into gas by the flame produced at the rear nozzle, the jet of burning gas serving as an injector to force the oil escaping from the nozzle, as well as air sufficient to support combustion, into the drum.

Having thus described my invention, what I claim, and desire to secure by Letters Patent, is—

1. In combination with the smoke-box $b$, in which the volatile oxides are condensed, the rotating drum $c$, in which the metal is heated, and the movable section G, containing the heating devices, the removable receptacles F Z, in which the oxides and melted metal are collected, substantially as specified.

2. In combination with the movable section of the apparatus, the heating device, consisting of a central tube having a sliding annulus and a spring, and the bent tubes extending into said tube and terminating in nozzles, as described.

3. In combination with the stationary section, the longitudinal tube extending centrally into the rotating drum and provided with perforations and gas-connecting pipes and with water-pipes, as set forth, substantially as and for the purposes specified.

4. In combination with the drum and rear section of the apparatus, the perforated cylinder, located within the drum and provided with a series of longitudinal ledges, substantially as specified.

5. The heating device herein described, consisting of a main outer pipe or casing having jet-apertures, and a number of smaller tubes having a water-space between them for conducting the fuel, and water inlet and eduction pipes, substantially as shown, and for the purpose specified.

In testimony whereof I affix my signature, in presence of two witnesses, this 25th day of November, 1881.

T. H. CAMPBELL.

Witnesses:
J. J. McCARTHY,
H. J. ENNIS.